D. E. HUNTER.
RECORD CARD.
APPLICATION FILED SEPT. 23, 1908.

959,938.

Patented May 31, 1910.

2 SHEETS—SHEET 1.

WITNESSES:
Charles S. Woodbery
Josephine H. Ryan

INVENTOR:
David E. Hunter,
By Roberts, Roberts & Cushman,
Attorneys.

D. E. HUNTER.
RECORD CARD.
APPLICATION FILED SEPT. 23, 1908.

959,938.

Patented May 31, 1910.
2 SHEETS—SHEET 2.

WITNESSES:
Charles D. Woodbury
Josephine H. Ryan

INVENTOR:
David E. Hunter,
By Roberts, Roberts & Cushman,
attorneys.

UNITED STATES PATENT OFFICE.

DAVID E. HUNTER, OF CAMBRIDGE, MASSACHUSETTS, ASSIGNOR TO LIBRARY BUREAU, OF BOSTON, MASSACHUSETTS, A CORPORATION OF NEW JERSEY.

RECORD-CARD.

959,938. Specification of Letters Patent. Patented May 31, 1910.

Application filed September 23, 1908. Serial No. 454,431.

*To all whom it may concern:*

Be it known that I, DAVID E. HUNTER, a citizen of the United States, and resident of Cambridge, in the county of Middlesex and State of Massachusetts, have invented new and useful Improvements in Record-Cards, of which the following is a specification.

This invention relates to record cards, particularly to record cards provided with tabs or projections, such as are commonly used in card indexes, card catalogues, card ledgers and other card record systems.

Its object is to provide a record card having a tab or projection so incased or inclosed in celluloid, or other suitable material adapted to resist wear and moisture, as effectually to protect and reinforce the tab against the destructive effects of handling the same. While I believe sheet celluloid to be the best material for incasing the card tabs as aforesaid, by reason of its ductility, transparency, flexibility, durability and imperviousness to moisture, I do not wish to be limited to such material, since any other material which may be found to be adapted for the purpose is within the scope and contemplation of my invention. Nevertheless, as celluloid is the best material at present known to me, I will address my description to the reinforcing and incasing of the tabs in celluloid.

Figure 1:
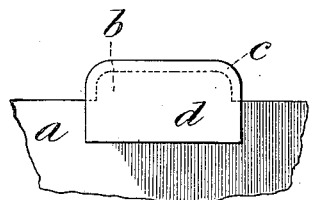
Figure 2:
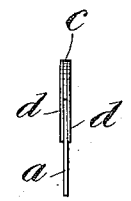
Figure 3:
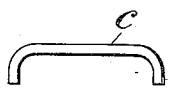
Figure 4:
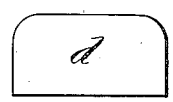
Figure 5:
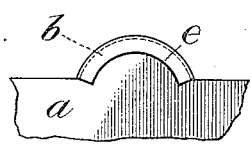
Figure 6:
Figure 7:
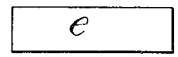
Figure 8:
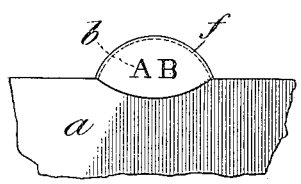
Figure 9:
Figure 10:
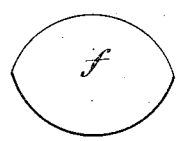
Figure 11:
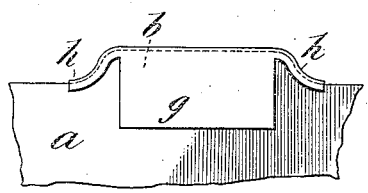
Figure 12:
Figure 13:
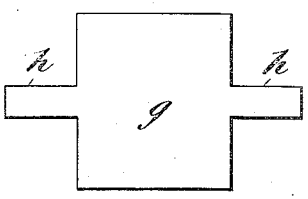
Figure 14:
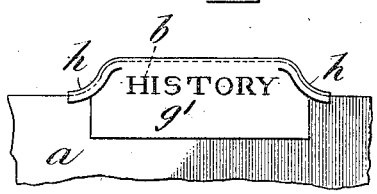
Figure 15:
Figure 16:
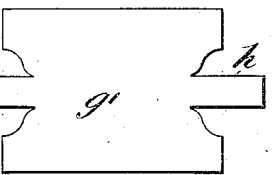
Figure 17:
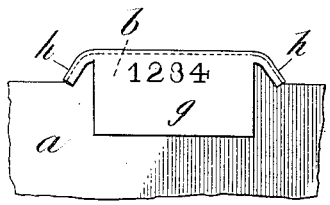
Figure 18:
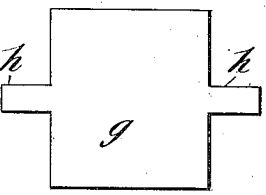
Figure 19:
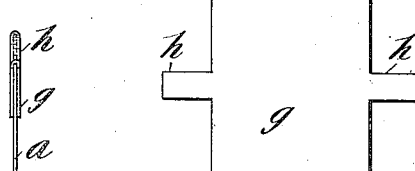
Figure 20:
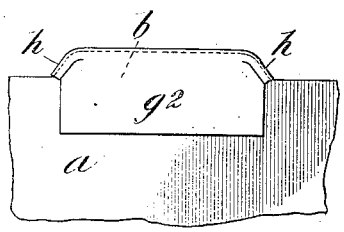
Figure 21:
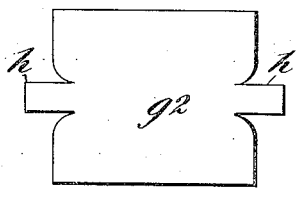
Figure 22:
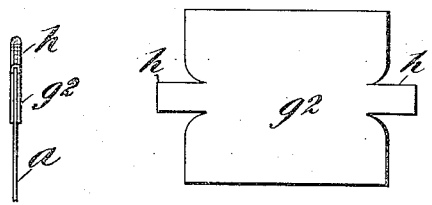

In the accompanying drawings which illustrate certain embodiments of my invention, Figure 1 represents the face of a card containing a tab or projection incased in and protected by celluloid in one manner; Fig. 2 is an edge view of the card and tab shown in Fig. 1; Fig. 3 is a plan view in detail of the edge filler used in the incasement shown in Fig. 1; Fig. 4 is a plan view in detail of the face coverings for the tab of the form used in Fig. 1; Fig. 5 represents the face of a card containing a tab or projection incased in and protected by celluloid in another manner; Fig. 6 is an edge view of the card and tab shown in Fig. 5; Fig. 7 is a plan of the blank used for covering or incasing the tab as shown in Fig. 5; Fig. 8 represents the face of a card containing a tab or projection incased in and protected by celluloid in another manner; Fig. 9 is an edge view of the card and tab shown in Fig. 8; Fig. 10 is a plan of the blank used for covering and incasing the tab as shown in Fig. 8; Fig. 11 represents the face of a card containing a tab or projection incased in and protected by celluloid in another manner; Fig. 12 is an edge view of the card and tab shown in Fig. 11; Fig. 13 is a plan of the blank used for covering and incasing the tab as shown in Fig. 11; Fig. 14 represents the face of a card containing a tab or projection incased in and protected by celluloid in another manner; Fig. 15 is an edge view of the card and tab shown in Fig. 14; Fig. 16 is a plan of the blank used for covering and incasing the tab shown in Fig. 14; Fig. 17 represents the face of a card containing a tab or projection incased in and protected by celluloid in another manner; Fig. 18 is an edge view of the card and tab shown in Fig. 17; Fig. 19 is a plan view of the blank used for covering and incasing the tab shown in Fig. 17; Fig. 20 represents the face of a card containing a tab or projection incased in and protected by celluloid in another manner; Fig. 21 is an edge view of the card and tab shown in Fig. 20; Fig. 22 is a plan view of the blank used for covering and incasing the tab shown in Fig. 20; and Fig. 23 is a perspective view of a method heretofore employed for reinforcing and protecting the tabs of record cards.

Figure 23:
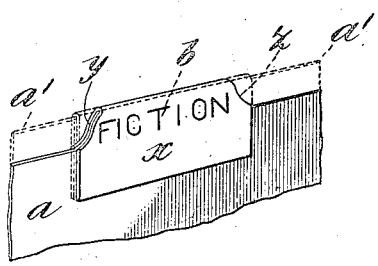

It has hitherto been proposed partially to protect the tabs of paper or pasteboard record cards by means of celluloid which is transparent and therefore does not conceal any inscription which may be upon the tab, and this has been practiced in the manner illustrated in Fig. 23. According to this method a rectangular sheet of celluloid $x$ is folded over the edge of a straight edged card $a$ and cemented thereto, and thereafter, by suitable instruments, parts of the upper edge of the card and the corners of the attached celluloid sheet are cut away as shown at $a'$ leaving the tab $b$ projecting from card $a$, and covered along its top edge and faces by the celluloid covering, but leaving the side edges of the tab $b$ unprotected and exposed as shown at $y$ and $z$. While this form of protection for the tab may be better than none, it has proved unsatisfactory and is open to many objections. In the manipulation of tab cards of this sort in a card record system, it is found that more wear comes upon the tabs at the corners and side edges than at the top edge. Moisture from the hands of the user, or from the atmosphere, coming in contact with the exposed side edges of the cardboard tab b, together with constant wear thereon and at the corners of the tab, tends to cause the cardboard to swell, and the cardboard and celluloid to separate along the exposed edges y and z, and eventually causes the celluloid sheet to crack at the fold along the top edge of the tab, thus destroying the covering and eventually the tab itself. Furthermore, with the above described method of cutting out the tab after the celluloid has been applied, it has been found that the cutter tends to separate the celluloid from the card during the process of cutting with the result that the protective covering of the tab is in a condition more quickly to break down under the stress of wear. It is to overcome the defects of such devices as the above that my invention is designed.

In carrying out my invention, I provide a protected tab whose edge is wholly incased in celluloid or some other suitable material so that no part of the pasteboard or paper tab, and particularly no part of the edge thereof, is exposed to the effects of wear and moisture, but the same is wholly incased and sealed within said protective covering, thus rendering the tab proper to all intents and purposes indestructible.

Referring to Figs. 1 to 4 inclusive of the drawings, a represents a record card having at one edge thereof a tab or projection b. At each face of the tab b is secured a sheet of celluloid d conforming in general shape with the contour of the tab but projecting slightly beyond the edge thereof as shown in Fig. 1. Between the projecting edges of the pieces d, and covering the edge of the tab b, is inserted a piece of celluloid c cut from a sheet of the same thickness as the card a. The parts thus assembled are cemented by amyl acetate or alcohol or other suitable cement and constitute a casing or covering for the tab b wholly incasing and sealing the same against the effects of wear and moisture.

Referring to Figs. 5, 6 and 7, the card a is shown having the tab b of curved form, and the covering e is made from a blank consisting of a flat rectangular sheet of celluloid as shown in Fig. 7. I have discovered that sheet celluloid is fairly ductile, especially in the presence of heat, and the blank e may be folded and drawn without puckering or creasing into conformation with the shape of the tab b, thus wholly incasing and sealing the edge thereof as shown in Figs. 5 and 6.

Referring to Figs. 8, 9 and 10, the tab b on the card a is shown as similar in form to the tab in Figs. 5 and 6, and the sheet celluloid blank is cut in ovoid shape as shown in Fig. 10 and folded and drawn into conformation with the shape of the tab b incasing both the edges and the entire surface of the faces of the tab as shown in Figs. 8 and 9.

Referring to Figs. 11, 12 and 13, a tab b is shown having a straight top edge and ogee curve side edges, and the sheet celluloid blank for incasing the same consists of a body portion g having two wings, adapted to be folded over the top edge of the tab with the wings overlying the opposed faces of the tab, and having at each end a tail piece h which is folded over the curved side edges of the tab and drawn into shape to conform therewith as shown in Figs. 11 and 12. In this form it will be seen that there is a space between the lateral edges of the wings and the edges of the tail pieces when the parts are assembled. Such construction would generally be found satisfactory but should it be desired wholly to cover the faces of the tab, the devices shown in Figs. 14, 15 and 16 may be employed wherein the lateral edges of the wings of the blank $g'$ are cut on curved lines to abut against the edges of the tail pieces when the blank is applied to the card as shown in Fig. 14, thus wholly covering and sealing not only the edges of the tab but the faces thereof by the celluloid incasement.

In Figs. 17, 18 and 19 is shown a further modification wherein the celluloid blank is similar to that shown in Fig. 13, but the side edges of the tab b are formed on a different curve from that shown in Figs. 11 and 14, the article being otherwise made in the same manner as already described; and in case it should be desired to close the spaces between the lateral edges of the wings and the edges of the tail pieces h, the device shown in Figs. 20, 21 and 22 is used wherein the blank $g^2$ has side wings whose lateral edges are curved to conform with the general shape of the tab b of Fig. 20, so that when the parts are assembled the edges of the wings will abut against the edges of the tail pieces as shown in Fig. 20, thus wholly incasing the faces as well as the edges of the tab.

In all of the above forms the celluloid incasement may be secured to the card by amyl acetate, or alcohol, or other suitable cement, and the celluloid blanks may, if desired, instead of being drawn into shape to conform with the curved edges of the tab, be molded or cast. Inasmuch as sheet celluloid is sufficiently ductile for the purpose, I believe that the best mode of forming blanks such as shown in Figs. 5 to 22 inclusive, is to draw them into the desired shape, using heat if necessary, by means of dies.

Other forms of tabs, and other forms of blanks, and other materials than celluloid may be used, and I do not desire to be limited to the specific forms above described, since my invention in its broader aspects contemplates the use of any form of protective covering of suitable material which wholly incases and protects the vulnerable edges of the tabs at all points, so that they will not be effected by the wear and moisture incident to handling. While this is well accomplished by the form of protective covering illustrated in Figs. 1 to 4 inclusive, which affords a protective covering wholly incasing the tabs, the forms illustrated in the other figures are believed to be preferable, for the reason that not only do they wholly incase and seal the edges of the tab, but this is accomplished by a seamless reinforcement which prevents all possibility of the separation of the two sides of the protective covering by wear at the edges of the tab, which separation might, to some extent, result with the use of the form shown in Figs. 1 to 4 inclusive, wherein there are seams between the several layers of the celluloid incasement.

I claim:

1. As a new article of manufacture, a record card provided with a tab or projection, the edges of said tab or projection being wholly incased in and protected by a transparent material adapted to resist wear.

2. As a new article of manufacture, a record card provided with a tab or projection, the edges of said tab or projection being wholly incased in and protected by celluloid.

3. As a new article of manufacture, a record card provided with a tab or projection, the edges of said tab or projection being wholly incased in and protected by a seamless covering of a transparent material adapted to resist wear, shaped to conform with the contour of the tab or projection.

4. As a new article of manufacture, a record card provided with a tab or projection, the edges of said tab or projection being wholly incased in and protected by a seamless sheet of celluloid shaped to conform with the contour of the tab or projection.

5. As a new article of manufacture, a record card provided with a tab or projection, said tab or projection being both at its sides and at its edges incased in and protected by a transparent material adapted to resist wear.

6. As a new article of manufacture, a record card provided with a tab or projection, said tab or projection being both at its sides and at its edges incased in and protected by celluloid.

7. As a new article of manufacture, a record card provided with a tab or projection, said tab or projection being both at its sides and at its edges incased in and protected by a sheet of celluloid shaped over said tab or projection and conforming with the contour thereof.

8. As a new article of manufacture, a record card provided with a tab or projection, the edge of said tab or projection being covered and protected by a sheet of celluloid drawn into a shape to embrace and conform with the edge of the tab.

9. As a new article of manufacture, a record card of cardboard or paper provided with an integral tab or projection, said tab or projection being both at its sides and at its edges wholly incased in and protected by sheet celluloid, whereby no part of said cardboard or paper tab is exposed to wear.

10. As a new article of manufacture, a record card having a tab or projection, said tab or projection provided with a protective covering comprising a body portion having a pair of side wings covering the top edge and overlying the faces of the tab, and a pair of tail pieces embracing and covering the side edges of the tab.

11. As a new article of manufacture, a record card having a tab or projection, said tab or projection provided with a protective covering of sheet celluloid comprising a body portion having a pair of side wings covering the top edge and overlying the faces of the tab, and a pair of tail pieces embracing and covering the side edges of the tab.

12. As a new article of manufacture, a record card having a tab or projection, said tab or projection provided with a protective covering of sheet celluloid comprising a body portion having a pair of side wings covering the top edge and overlying the faces of the tab, and a pair of tail pieces embracing and covering the side edges of the tab, the lateral edges of the side wings being so fashioned as to abut against the sides of the tail pieces edge to edge, thus wholly covering the faces of the tab.

13. As a new article of manufacture, a record card provided with an integral tab or projection, and a water-proof protector inclosing the edge, ends and face of the tab.

14. As a new article of manufacture, a record card provided with an integral tab or projection, a sheet of transparent waterproof material folded over the tab or projection, inclosing the opposite surfaces thereof, such fold inclosing both the top edge and end edges of the tab so as to prevent the admission of moisture to the edges of the tab or between the edges of the tab and the sheet.

Signed by me at Boston, Massachusetts, this eighth day of September, 1908.

DAVID E. HUNTER.

Witnesses:
FLORENCE A. COLLINS,
ROBERT CUSHMAN.